Figure 2:
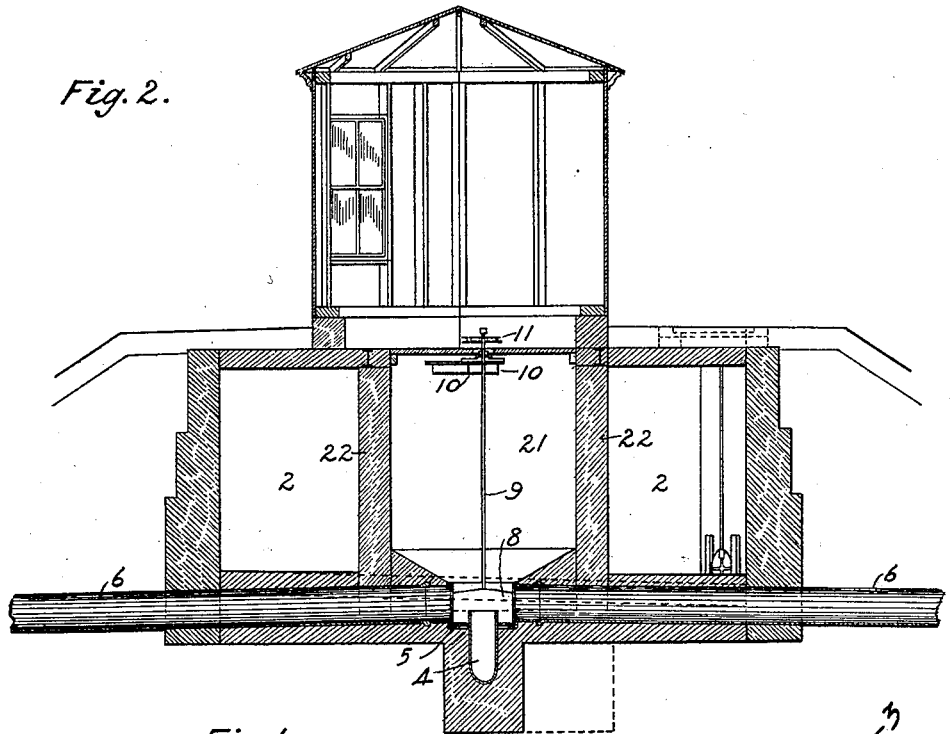

No. 645,160. Patented Mar. 13, 1900.
F. A. BARBOUR.
APPARATUS FOR APPLYING SEWAGE TO FILTER BEDS.
(Application filed Apr. 27, 1899.)
(No Model.) 3 Sheets—Sheet 1.

Witnesses.
E. W. Clark
G. R. Kingman

Inventor
Frank A. Barbour
by W. A. Copeland
atty

No. 645,160. Patented Mar. 13, 1900.
F. A. BARBOUR.
APPARATUS FOR APPLYING SEWAGE TO FILTER BEDS.
(Application filed Apr. 27, 1899.)
(No Model.) 3 Sheets—Sheet 2.
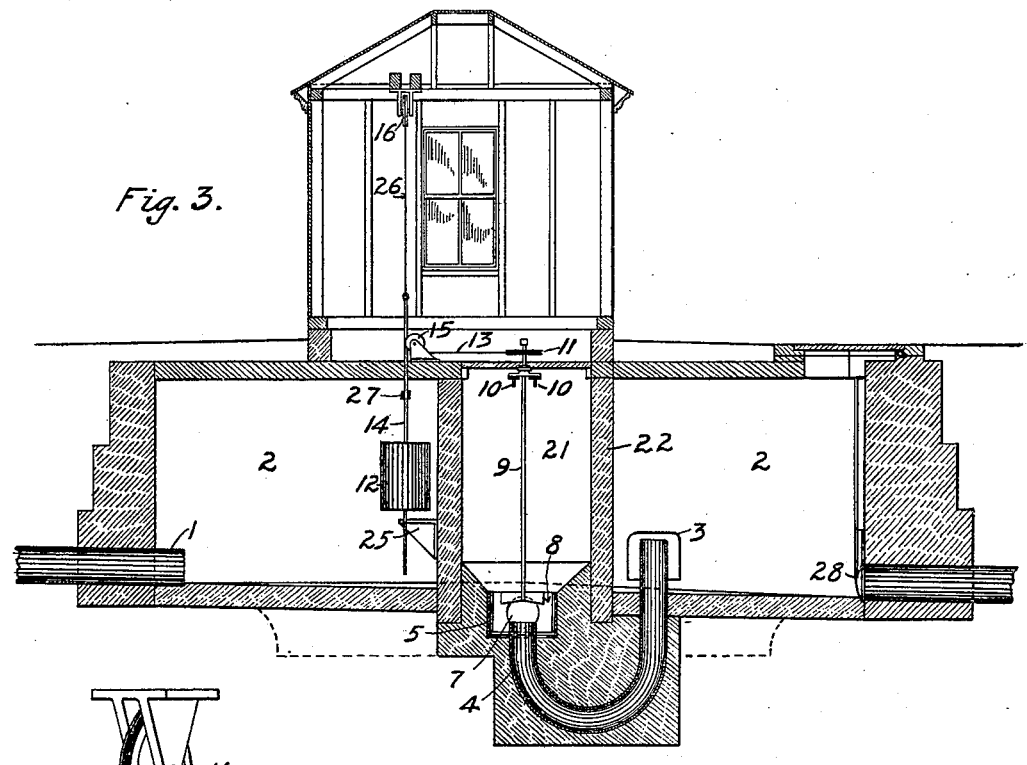
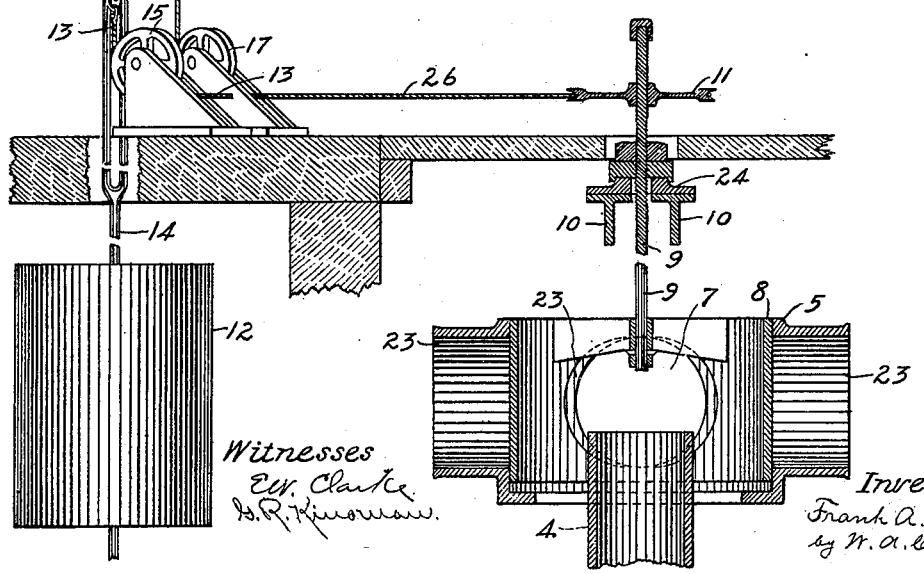
Witnesses
Inventor
Frank A. Barbour
by W. A. Copeland
atty No. 645,160. Patented Mar. 13, 1900.
F. A. BARBOUR.
APPARATUS FOR APPLYING SEWAGE TO FILTER BEDS.
(Application filed Apr. 27, 1899.)

(No Model.) 3 Sheets—Sheet 3.

Witnesses
Robert Wallace.
Alice H. Morrison.

Inventor
Frank A. Barbour
by W. A. Copeland
atty.

UNITED STATES PATENT OFFICE.

FRANK A. BARBOUR, OF BROCKTON, MASSACHUSETTS, ASSIGNOR OF ONE-HALF TO FRANK H. SNOW, OF SAME PLACE.

APPARATUS FOR APPLYING SEWAGE TO FILTER-BEDS.

SPECIFICATION forming part of Letters Patent No. 645,160, dated March 13, 1900.

Application filed April 27, 1899. Serial No. 714,721. (No model.)

*To all whom it may concern:*

Be it known that I, FRANK A. BARBOUR, of Brockton, in the county of Plymouth and State of Massachusetts, have invented certain new and useful Improvements in Apparatus for Applying Sewage to Beds for Purification, of which the following is a specification.

My invention relates to a new and useful apparatus for applying sewage or other impure liquids to beds composed of material suitable for the purification of these liquids. It is a well-known fact that the natural transformation of decomposing organic matter into harmless inorganic compounds depends upon the life functions of the minute vegetable organisms, and it is equally well known that the particular organism which is essential to the process of filtration or purification by passing through beds of porous material is aerobic and requires for its development a supply of oxygen. The process of purification depends, therefore, upon the retention of the impure liquid in such a condition that the microbes can act upon it for a time sufficient to effect the desired results. This is most easily obtained by applying the sewage to beds of porous material—such as sand, coke, burnt clay, or ashes—in which it is retained either by the friction of the bedding material or by gates on the underdrains for the necessary time. It is essential in order that sufficient air for the life of the microbes may enter the bed of the filter that the sewage be applied in proper turn to several beds.

The apparatus of my invention is designed to automatically apply the liquid to be purified in turn to two or more beds in doses apportioned to the capacity of the purifying material in order that the microbes or bacteria upon which the process of purification depends may obtain by this intermittent action the oxygen necessary to their life and development.

My invention will now be fully described, and particularly pointed out in the claims at the end of the specification.

The particular apparatus embodying my invention illustrated in the accompanying drawings is intended to effect automatically the application of the sewage in doses suitable to the material to four beds in turn. The number of beds may, however, be greater or less, as desired.

Figure 1:
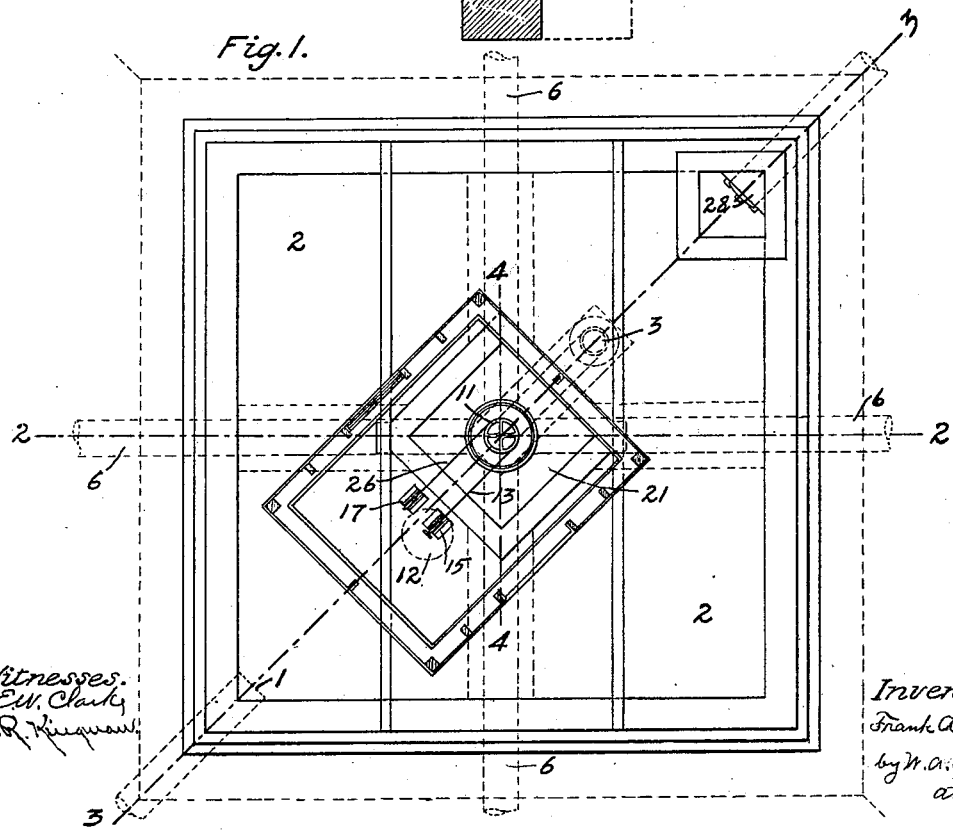
Figure 5:
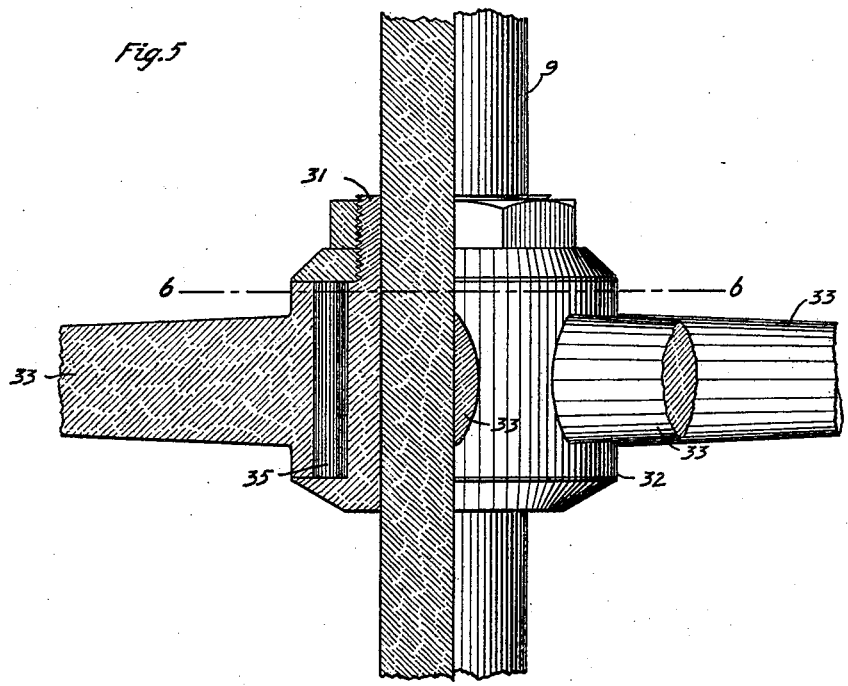
Figure 6:
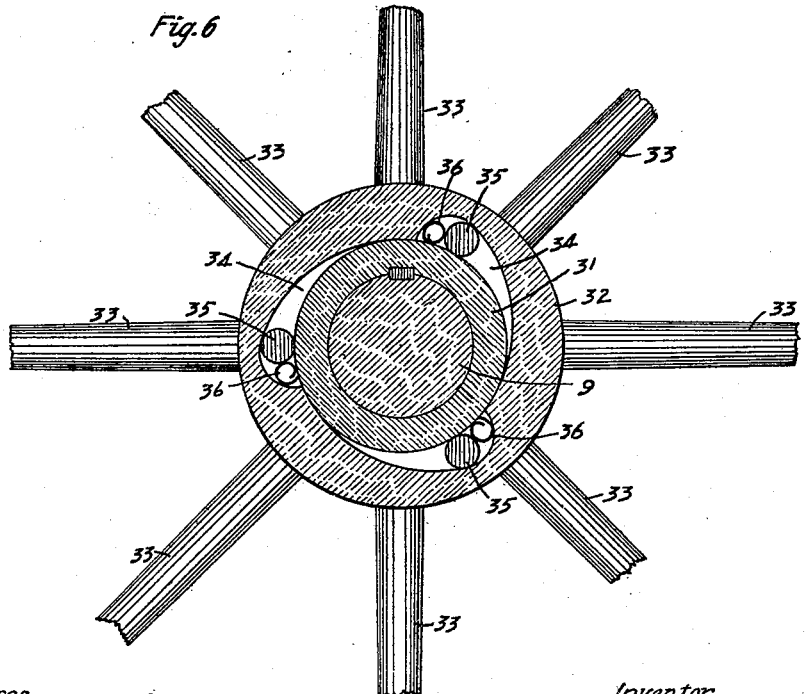

Figure 1 is a plan of the distribution-tank and automatic apparatus. Fig. 2 is a section taken on the line 2 2 of Fig. 1. Fig. 3 is a section on the line 3 3 of Fig. 1. Fig. 4 is an enlargement, one-half elevation and one-half section plan, on line 4 4 of Fig. 1 of the automatic apparatus and four-way-revolving gate. Fig. 5 is a detail elevation, half section, of the clutch mechanism which permits the gate to revolve only in one direction. Fig. 6 is a section on line 6 6 of Fig. 5.

I will first describe the general design of the distribution-tank and automatic dosing apparatus.

The outer or distribution tank 2 is a structure built of stone, brick, concrete, or other suitable material of a capacity equal to the size of dose which is found most suitable to the material of which the beds are composed. As shown in Fig. 1, it is square in plan and has in its center a small chamber 21, inclosed by a brick wall 22. The particular situation of this chamber is not essential. It might be on the outside of the tank. It is situated in the center merely for the sake of symmetrical development of the design. The sewage enters the outer tank 2 through an inlet-pipe 1, which can be placed at any elevation that will not interfere by back-flooding with the working of the inlet-sewer. An automatic siphon 3 leads from the outer tank 2 down through its bottom and up through the bottom of the inner chamber 21 and is so designed as to permit the inflow of the quantity of sewage predetermined as suitable for a single dose before discharge. This siphon may be of any of the well-known forms of automatic siphons. The action of the automatic siphon is such that when it does open the accumulated pressure will cause it to discharge at a much more rapid rate than the inflow, which, although continuous, is at a much slower rate than the outflow. The sudden discharge therefore will empty the tank. When the sewage has risen to a height predetermined by the design of the automatic siphon 3, it will be discharged by this siphon into the above-mentioned center chamber 21, into which the sewage has no access save through the siphon and which accordingly remains empty during the filling of the outer chamber. The end of the lower or discharge leg 4 of the siphon is in the center of the inner chamber 21. Surrounding this end of the siphon is a metal cylinder 5, carefully machined on its inner face to a true circle, containing in its circumference four openings 23, flanged on the outer side at equal distances apart. These openings 23 connect with the four pipes 6, leading to the four beds, the beds not being shown. Inside of this cylinder 5 another cylinder 8, machined on its outer face to a close fit with the cylinder just mentioned and having in its circumference one opening 7, is supported and revolved by a vertical shaft 9, which is hung from a suitable bearing 24, resting on T-irons 10 or other steelwork extending from wall to wall of the inner chamber. This inner cylinder 8 forms a revolving gate to the four pipes 6, closing the passage from the inner chamber 21 to the distribution-beds, except one at a time, when the opening 7 registers with one of said pipes 6. The opening 7 is preferably made oval to allow for play or imperfect alinement.

To the top of the vertical shaft 9 a horizontal pulley 11 is attached by a ratchet or friction-clutch, which permits the turning of this pulley in one direction without revolving the vertical shaft, while if turned in the other direction the shaft 9 and inner cylinder or four-way gate 8 is revolved. There are various forms of ratchet or friction-clutch which might be used. In the form of clutch shown in the drawings the collar 31 is keyed to the vertical shaft 9. The shell 32, which loosely surrounds the collar 31, forms the hub of the pulley 11, which is connected with the shell by spokes 33. It is formed with a series of pockets 34 larger at one end than at the other. Within these pockets are rollers 35 near the larger end, behind which are the springs 36. When the pulley turns in one direction, the rollers 35 roll as far as possible toward the narrower end of the pocket and bind the shell 32 to the collar 31, so that the shaft 9 will rotate with the pulley. When the pulley rotates in the reverse direction, the rollers 35 will be rolled back toward the larger end of the pocket against the springs 36, and the shell 32 will rotate without turning the shaft 9. I do not, however, claim the form of clutch shown as new with me, nor do I intend to limit myself to the use of that form of clutch. The pulley 11 is actuated by the rise of a float 12, the movement of which is transmitted, as illustrated in Fig. 4, to the pulley 11 by a wire rope 13. The method of transferring the movement of the float to the vertical shaft is, however, not essential, and may be done by gearing under certain conditions.

The float 12 is hung in the outer reservoir 2 and guided by a central rod 14, working in brackets 25, attached to the wall. This rod 14 extends through the roof of the tank, where it divides into two parts, permitting the rope 13 attached to it to obtain a vertical pull on the guiding-pulley 15, under which it is passed to the horizontal pulley 11. The point of attachment is shown in Figs. 1 and 3. It does not appear in Fig. 4, being cut away. To the top of this rod 14 another wire rope 26 is attached, which runs over pulleys 16 and 17 back to pulley 11.

The working of the apparatus will now be described. Assuming that the opening 7 of the inner cylinder 8 is exactly opposite one of the four openings 23 in the outer cylinder 5, (a position which can be effected by applying a hand-wrench to the top of the vertical shaft 9,) with the rise of the sewage in the outer tank 2, into which the sewage is constantly flowing, the float 12 and rod 14 are raised a distance necessary to turn the horizontal pulley 11 ninety degrees or one-quarter circle, this distance being determined by a stop 27, which prevents the float from rising to a greater height. The revolving of the pulley 17 one-fourth turn shifts the opening 7 in the inner cylinder from in front of one opening 23 in the vertical cylinder to the next opening 23, thus closing the passage through one pipe 6 to the next pipe 6 in order and changing the application of the sewage from one bed to the next in proper rotation. When the sewage is discharged into the inner chamber by the action of the siphon, it escapes through the opening in the four-way gate or revolving cylinder 8 to the bed, and with the falling of the sewage in the outer chamber during this discharge, as already described, the float 12 by its weight drops back and throws the horizontal pulley back one-quarter turn on the reverse action of the friction-clutch without moving the vertical shaft and inner cylinder, thus leaving the pulley in position to effect the one-quarter revolution of the cylinder on the next rise of the liquid in the reservoir. At the next quarter-turn the cylindrical gate 8 will close communication to the bed last supplied and open communication with another.

The apparatus, with such supervision as any labor-saving device demands, will be automatic and is valuable not only in its ability to reduce the necessary attendance on gates, but in the guarantee which it affords of absolute regularity of the application of the liquid to the purification-beds and the consequent working of these beds to the best possible advantage.

The pipe 28 is merely an emergency pipe to draw off the sewage, if desired, at any time should it be desirable to empty the outer tank without passing through the siphon.

What I claim is—

1. In an apparatus for applying sewage or other impure liquids to purification-beds, the combination of a distributing-tank which receives the raw sewage, an automatic siphon leading from said tank, a plurality of distribution-passages leading to several beds, a single gate which controls said passages, and apparatus actuated by the rise and fall of the liquid in the tank to operate said gate so as to open said passages one at a time and close all the others, substantially as described.

2. In an apparatus for applying sewage or other impure liquid to purification-beds, the combination of a distributing-tank of a capacity equal to the size of dose required, an automatic siphon which intermittently discharges the liquid from said tank, a single gate which controls a plurality of discharge-passages to the several beds, and apparatus actuated by the rise and fall of the liquid in the tank to operate said gate to successively open the passage to one of said beds and close the passages to the other beds, substantially as described.

3. The combination of a distribution-tank, an automatic siphon leading from said tank, a cylindrical chamber into which said siphon discharges, and having a series of outlets therefrom, an intermittently-revolving cylindrical gate within said chamber, said gate having an opening which registers successively with each of said outlets, a float in the distribution-tank which rises and falls with the liquid, and connection between said float and said gate whereby the gate is revolved by the movement of the float to open successively one outlet and close the others, substantially as described.

4. The combination of a distribution-tank, an automatic siphon leading from said tank, a cylindrical chamber into which said siphon discharges, and having a series of outlets therefrom, an intermittently-revolving cylindrical gate within said chamber, said gate having an opening which registers successively with each of said outlets, a float in the distribution-tank which rises and falls with the liquid, and a rope-and-pulley connection between said float and said gate whereby said gate is revolved by the movement of the float to successively open one outlet and close the others, substantially as described.

5. In combination with a tank, a float which rises and falls with the liquid in said tank, a cylindrical chamber having a series of side outlets, a cylindrical gate revolving within said chamber and having an opening which registers successively with said outlets, one at a time, and closes the other outlets, connection between said cylindrical gate and the float whereby when the float rises the gate will revolve until its opening registers with one of said outlets, and mechanism which prevents backward rotation of the gate when the float falls, substantially as described.

6. In combination with a cylindrical chamber having a series of side outlets, a cylindrical gate revolving within said chamber, and having an opening which registers successively with said outlets one at a time, and closes the other outlets, a stem connected with said gate and mechanism connected with said stem which automatically turns said gate intermittently, substantially as described.

In testimony whereof I have affixed my signature in presence of two witnesses.

FRANK A. BARBOUR.

Witnesses:
WILLIAM A. COPELAND,
G. R. KINGMAN.